(12) United States Patent
Nasir et al.

(10) Patent No.: US 9,813,308 B2
(45) Date of Patent: Nov. 7, 2017

(54) STATISTICAL MONITORING OF CUSTOMER DEVICES

(71) Applicant: Verizon Patent and Licensing Inc., Basking Ridge, NJ (US)

(72) Inventors: Azim Nasir, Foxboro, MA (US); Andre R. Turner, Belmont, MA (US); Hong Xiao, Acton, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 132 days.

(21) Appl. No.: 14/295,787

(22) Filed: Jun. 4, 2014

(65) Prior Publication Data
US 2015/0358218 A1 Dec. 10, 2015

(51) Int. Cl.
*G06F 15/173* (2006.01)
*H04L 12/24* (2006.01)
*H04L 12/28* (2006.01)
*G06Q 30/00* (2012.01)
*G06Q 10/00* (2012.01)

(52) U.S. Cl.
CPC ...... *H04L 41/5025* (2013.01); *H04L 12/2823* (2013.01); *H04L 41/0803* (2013.01); *H04L 41/5009* (2013.01); *H04L 41/5061* (2013.01); *G06Q 10/20* (2013.01); *G06Q 30/012* (2013.01)

(58) Field of Classification Search
None
See application file for complete search history.

(56) References Cited

U.S. PATENT DOCUMENTS

| | | | | |
|---|---|---|---|---|
| 7,711,814 B1 * | 5/2010 | Emerick | ............ | G06F 11/3062 370/241 |
| 8,751,414 B2 * | 6/2014 | Datta | ................. | G06F 11/0751 706/11 |
| 2005/0033593 A1 * | 2/2005 | Abrams | ............... | G06Q 10/025 705/302 |
| 2013/0282624 A1 * | 10/2013 | Schackmuth | ........ | G08B 21/182 705/412 |

(Continued)

OTHER PUBLICATIONS

Gustavo Patrício et al., "Smart House monitoring and actuating system development using automatic code generation", 2009 7th IEEE International Conference on Industrial Informatics.*

*Primary Examiner* — Lance Leonard Barry
*Assistant Examiner* — Mohammad Yousuf A Mian

(57) ABSTRACT

A network device receives configuration information for monitoring, via a network, control data for a monitored customer device. The configuration information includes business rules for responding to an event when the control data is outside baseline control limits. The network device identifies original equipment manufacturer (OEM) or service provider recommended limits for the control data and receives initial control data, associated with the monitored customer device, for a particular time period. The network device determines, based on the initial control data, baseline control limits related to the OEM or service provider recommended limits. The network device receives, an indication of an out-of-bounds event, wherein the out-of-bounds event includes at least one instance where subsequent control data is outside the baseline control limits and initiates, based on the business rules, an action responsive to the out-of-bounds event.

20 Claims, 16 Drawing Sheets

(56) References Cited

U.S. PATENT DOCUMENTS

2014/0055082 A1\* 2/2014 Kun .................. H02J 7/044
            320/107
2014/0244213 A1\* 8/2014 Theriot ............... G06F 11/30
            702/183
2015/0025689 A1\* 1/2015 Saravanapriyan . G05B 23/0216
            700/275

\* cited by examiner

STATISTICAL MONITORING OF CUSTOMER DEVICES

BACKGROUND

A customer may have a large number of devices that generate measurable performance-related data. For example, a customer's home may include a television, a computer, a stereo system, an oven, a refrigerator, a washing machine, and/or other electronic devices. Outside the home, a customer may have mobile devices, vehicles, and other equipment that may also collect performance-related data. When these customer devices experience degraded performance and/or eventually break down, a customer may typically call a customer support center or technician for service or instructions. In some instances, relatively minor performance issues may continue for some time before they are recognized and/or cause action by a customer.

DETAILED DESCRIPTION OF THE PREFERRED EMBODIMENTS

The following detailed description refers to the accompanying drawings. The same reference numbers in different drawings may identify the same or similar elements.

Systems and/or methods described herein provide a platform to monitor customer devices connected via a network, such as an in-home network. Initial monitoring may be conducted for monitored customer devices (such as set-top boxes, "smart" appliances, computing devices, telematics-equipped vehicles, and the like) installed at customer locations to establish customer-specific baselines in the context of original equipment manufacturer (OEM) recommend baselines for particular performance-related data. The monitored customer devices may continue to collect and report data on a periodic basis. The systems and/or methods may receive and apply rules to monitor the reported data, provide notifications, and initiate other actions, as required, based on the monitored data.

In one implementation, a network device may receive configuration information for monitoring, via a network, control data for a monitored customer device. The configuration information includes business rules for responding to an event when the control data is outside baseline control limits. The network device may identify OEM recommended limits for the control data and receive initial control data, associated with the monitored customer device, for a particular time period. The network device may determine, based on the initial control data, baseline control limits related to the OEM recommended limits. The network device may receive an indication of an out-of-bounds event, wherein the out-of-bounds event includes one or multiple instances where subsequent control data is outside the baseline control limits and may initiate, based on the business rules, an action responsive to the out-of-bounds event.

Figure 1:
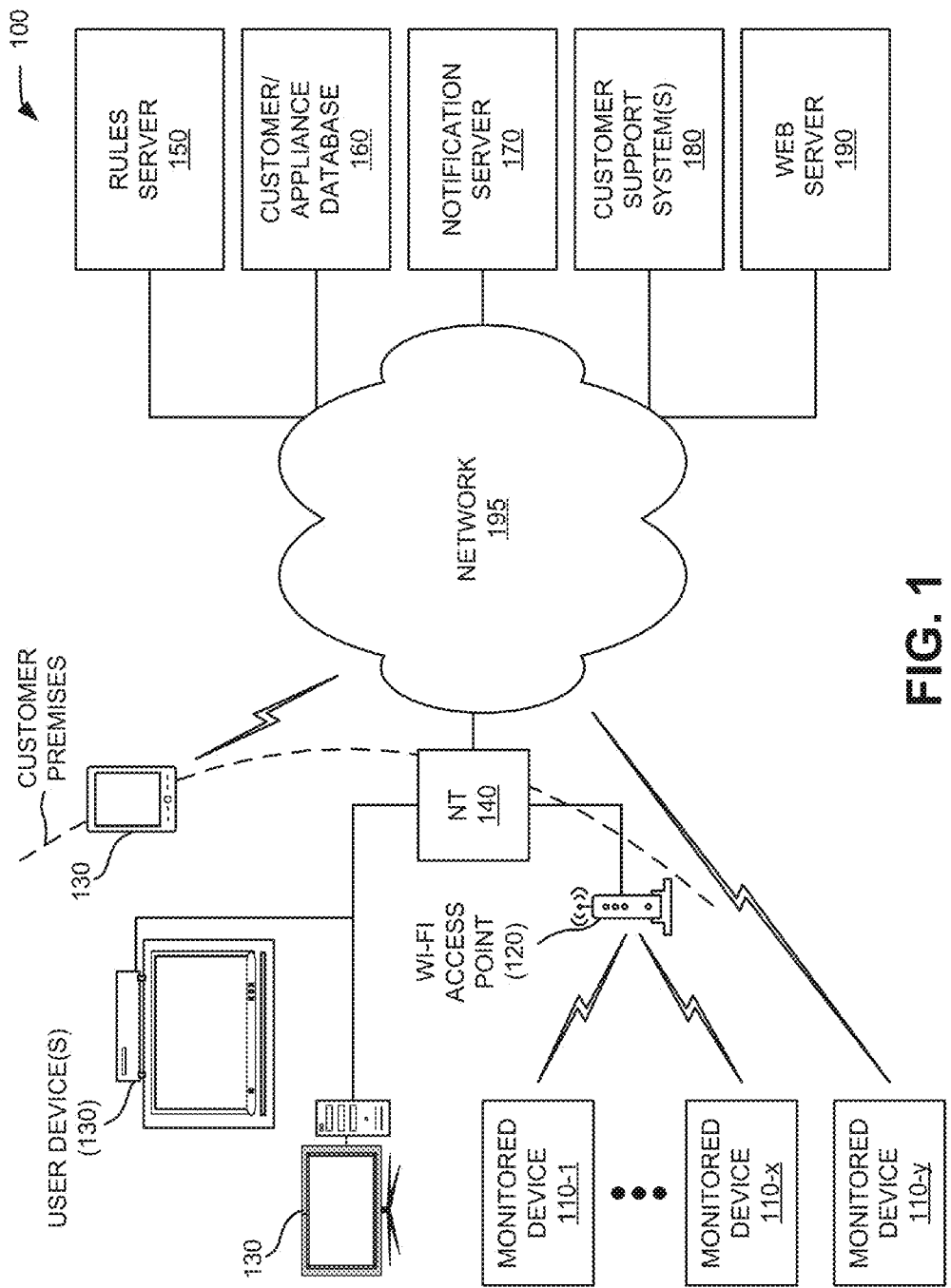
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include one or more monitored customer devices 110-1 through 110-$y$ (also referred to herein collectively as "monitored devices 110" and generically as "monitored device 110"), a Wi-Fi access point 120, user devices 130, a network terminal (NT) 140, a rules server 150, a customer/appliance database 160, notification server 170, customer support system(s) 180, web server 190, and a network 195. Components of network environment 100 may be connected via wired and/or wireless links. In one implementation, components in network environment 100 may communicate using application programming interfaces (API) to regulate interactions between devices.

Monitored device 110 may include an electronic appliance device with wired or wireless communication capabilities, such as an oven, a microwave, a dishwasher, a dryer, a dish washing machine, a refrigerator; a home monitoring system and/or a device associated with a home monitoring system such as a security sensor (e.g., a motion detector, a sound detector, etc.), a door lock, a window lock, a garage door controller, a light control device, a fire/smoke monitoring device, a video monitoring device, and/or another home monitoring device; a climate control device, such as thermostat, an energy meter, an air conditioning (AC) device, a heater, and/or another type of climate control device; a set-top box (STB); an Internet Protocol (IP) television; one of user devices 130; a vehicle telematics unit (e.g., for a car, boat, truck, etc.); and/or another type of electronic device. Generally, monitored device 110 may include any type of device that can capture performance-indicating data and distribute the data via a network.

Monitored device 110 may be located within or outside of a customer premises. In one implementation, monitored device 110 may include a wireless transceiver configured to communicate with one or more of Wi-Fi access point 120, user devices 130, and/or network 195. For example, monitored device 110 may include a Bluetooth transceiver, a near-field communications (NFC) transceiver, a Wi-Fi transceiver, and/or a Long-Term Evolution (LTE) transceiver. In another implementation, monitored device 110 may communicate via a wired MoCA (multimedia over coax) or Ethernet interface.

Wi-Fi access point (AP) 120 may be configured to enable monitored devices 110 and other devices in customer premises to communicate with each other. For example, Wi-Fi access point 120 may be configured to use IEEE 802.11 standards for implementing a wireless LAN network. Wi-Fi AP 120 may enable monitored devices 110 and/or user devices 130 to communicate with each other and/or with NT 140.

User device 130 may include a mobile electronic device or a stationary electronic device that is capable of communicating with other devices in the customer premises. User device 130 may also communicate with rules server 150, notification server 170, web server 190, and/or other devices via network 195. In one implementation, user device 130 may provide an interface to configure monitoring of monitored devices 110 and/or receive service notifications from notification server 170. In one implementation, user device 130 may also be a monitored device 110. In another implementation, user device 130 may include an Internet-enabled device such as a computer workstation, desktop computer, or another networked device. In still another implementation, user device 130 may include components of a television-based communication system, such as, for example, a set-top box (STB), a home media server, a gaming console, or an Internet television.

Network terminal (NT) 140 may receive data from network 195 via a connection, such as, for example, a fiber optic cable connection, a coaxial cable connection, a wireless connection, and/or another type of connection. Furthermore, NT 140 may send information from a device associated with the customer premises to rules server 150 or another device via network 195. In one implementation, NT 140 may include an optical network terminal as part of a high-speed fiber optic network. In another implementation, NT 140 may include a cable modem. In yet another implementation, NT 140 may include a fixed wireless transceiver, a WiFi access point, and/or a Bluetooth device. Additionally or alternatively, NT 140 may include a layer 2 and/or layer 3 network device, such as a switch, router, firewall, and/or gateway. NT 140 may provide one or more services to devices in the customer premises via the connection between NT 140 and network 195, such as, for example, a television service, Internet service, and/or voice communication (e.g., telephone) service.

Rules server 150 may include one or more devices, such as computer devices, network devices, and/or server devices, which are configured to receive control data or event indications from monitored devices 110. Rules server 150 may apply business rules for responding to an out-of-bounds event when the control data is outside baseline control limits. In one implementation, rules server 150 may also identify OEM- or service provider-recommended limits, receive initial control data for a particular time period and associated with the monitored device 110, and determine baseline control limits for monitored device 110.

Customer/appliance database 160 may include a database or another data structure to store data pertaining to monitoring of monitored devices 110. Customer/appliance database 160 may store, for example, registration information, customer contact information, service data, notification history, and other processed by rules server 150, notification server 170, and/or web server 190. In one implementation, customer/appliance database 160 may include a cloud-based storage system of multiple networked devices.

Notification server 170 may include one or more devices, such as computer devices, network devices, and/or server devices, which are configured to send messages to user devices 130 (or customer accounts accessed by user devices 130) and/or customer support systems 180. Notification server 170 may, for example, receive an indication from rules server 150 that a particular monitored device 110 has reported data that violates the rule set associated with the particular monitored device 110. In response, notification server 170 may provide a notification message to the appropriate customer (e.g., user device 130) and/or customer support system 180, as identified by either rules server 150 and/or a profile in customer/appliance database 160. Notification server 170 may provide notifications via one or more of a text message, an email, a television/STB pop-up notification, a notification via a mobile application (app), a social media post, etc.

Customer support system(s) 180 may include one or more devices, such as computer devices, network devices, and/or server devices, which are configured to communicate with notification server 170 via network 195. In one implementation, customer support system 180 may be associated with a particular business or technician that provides maintenance services for particular types of monitored devices 110. Customer support system 180 may, for example, register to receive notification from notification server 170. For example, customer support system 180 may provide a profile of services and/or locations to support monitored devices 110. In another implementation, customer support system 180 may communicate with web server 190 to provide OEM specifications, service provider specifications, service schedules, warranty information, or other information relevant to registering monitored devices 110 for monitoring.

Web server 190 may include one or more devices, such as computer devices, network devices, and/or server devices, which receive monitored registration information and/or updates from monitored devices 110. Web server 190 may associate registration information and updates with particular user profiles to assemble a complete user record with monitoring information for multiple monitored devices 110. User records may be stored in and retrieved from, for example, in customer/appliance database 160. In another implementation, web server 190 may receive request, from user devices 130, for monitoring reports and run queries in customer/appliance database 160 to provide requested monitoring reports. In one implementation, web server 190 may be associated with a telecommunication services provider that provides telecommunications services (e.g., messaging services, data services, voice services, etc.) to monitored devices 110. Web server 190 may also receive login requests from user device 130 and verify credentials from user device 130 before providing data to user device 130.

Network 195 may include one or more networks including a cellular network, a satellite network, the Internet, an intranet, a telephone network, such as the Public Switched Telephone Network (PSTN), a metropolitan area network (MAN), a wide area network (WAN), a local area network (LAN), a mesh network, or another type of network. In an exemplary implementation, communication network 195 may include a combination of networks including a cellular network that uses components for transmitting data to and from monitored devices 110, user devices 130, etc. Such components may include base station antennas (not shown) that transmit and receive data from communication devices within their vicinity. Such components may also include base stations (not shown) that connect to the base station antennas and communicate with other devices, such as switches and routers (not shown) in accordance with known techniques.

Figure 2:
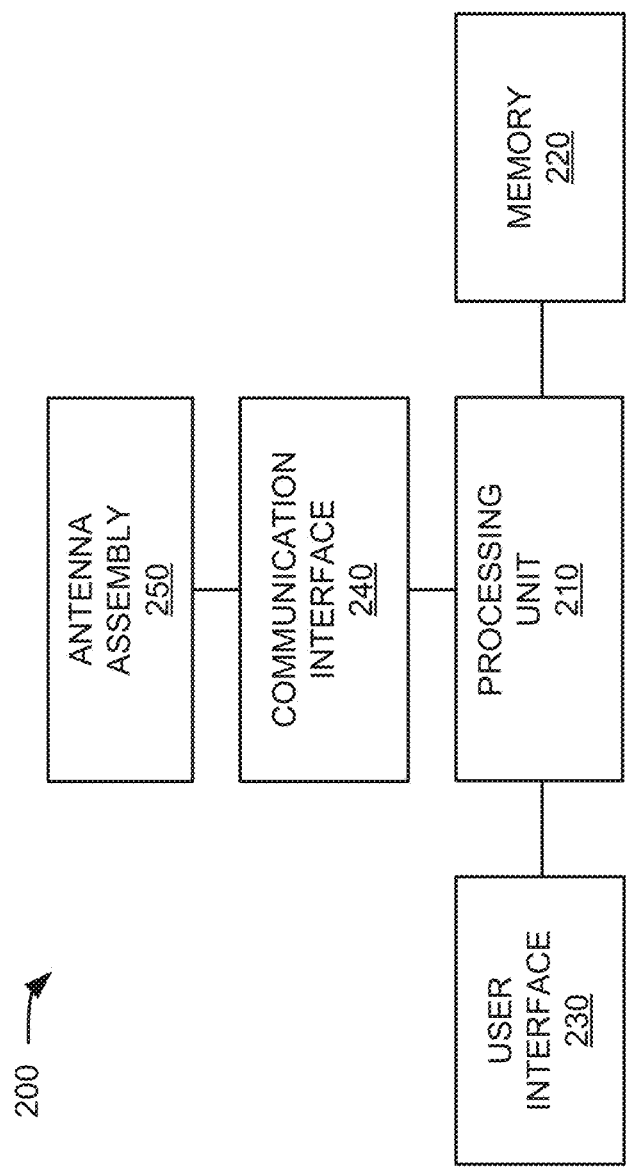
FIG. 2 is a diagram of exemplary components of one of the devices of FIG. 1.

FIG. 2 is a diagram illustrating exemplary components of a device 200, according to an implementation described herein. monitored devices 110 and/or some user devices 130 (e.g., a mobile device) may each include one or more devices 200. As shown in FIG. 2, device 200 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), and/or other processing logic. Processing unit 210 may control operation of device 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 200 to vibrate; a sensor; and/or any other type of input or output device.

Communication interface 240 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a NFC wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals via an antenna and receive RF signals from an antenna and provide them to communication interface 240.

As described herein, device 200 may perform certain operations in response to processing unit 210 executing software instructions contained in a computer-readable medium, such as memory 220. A computer-readable medium may be defined as a non-transitory memory device.

A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of device 200, in other implementations, device 200 may include fewer components, different components, differently-arranged components, or additional components than those depicted in FIG. 2. Additionally or alternatively, one or more components of device 200 may perform the tasks described as being performed by one or more other components of device 200.

Figure 3:
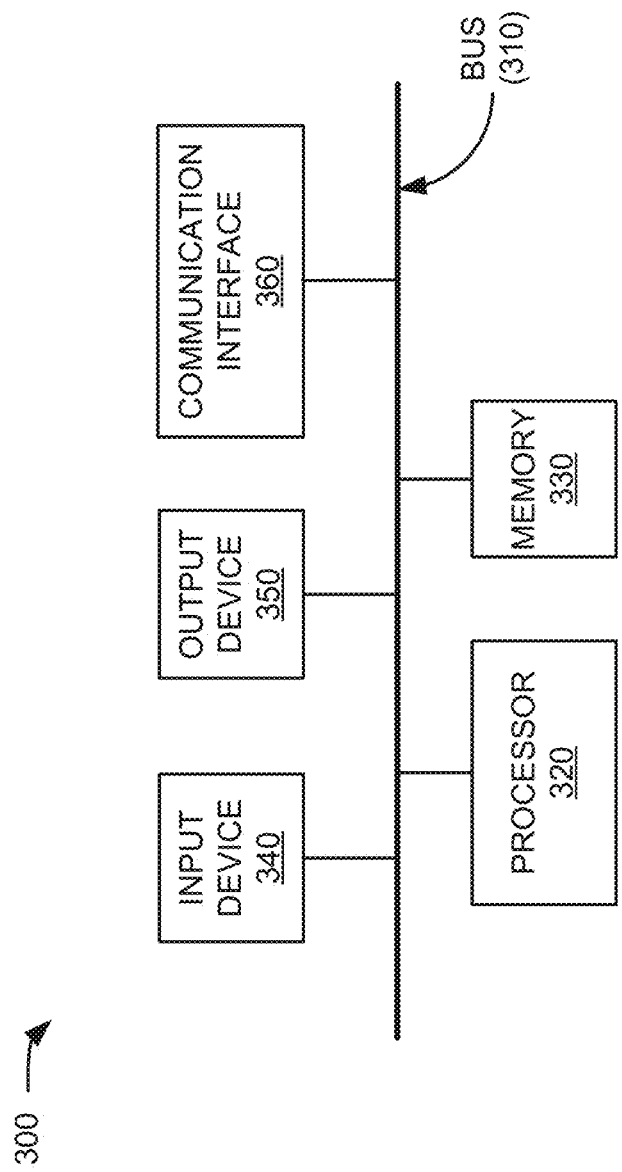
FIG. 3 is a diagram of exemplary components of another one of the devices of FIG. 1 1.

FIG. 3 is a diagram illustrating exemplary components of device 300 according to an implementation described herein. Each of rules server 150, notification server 170, customer support system 180, web server 190, and some user devices 130 (e.g., personal computers, STBs, etc.) may include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a USB port for communications over a cable, a Bluetooth™ wireless interface, a RFID interface, a NFC wireless interface, and/or any other type of interface that converts data from one form to another form.

As will be described in detail below, device 300 may perform certain operations relating to processing data from monitored devices 110 and/or applying rules for one or more monitored devices 110. Device 300 may perform these operations in response to processor 320 executing software instructions contained in a computer-readable medium, such as memory 330.

Although FIG. 3 shows exemplary components of device 300, in other implementations, device 300 may include fewer components, different components, additional components, or differently-arranged components than those depicted in FIG. 3. Additionally or alternatively, one or more components of device 300 may perform one or more tasks described as being performed by one or more other components of device 300.

Figure 4:
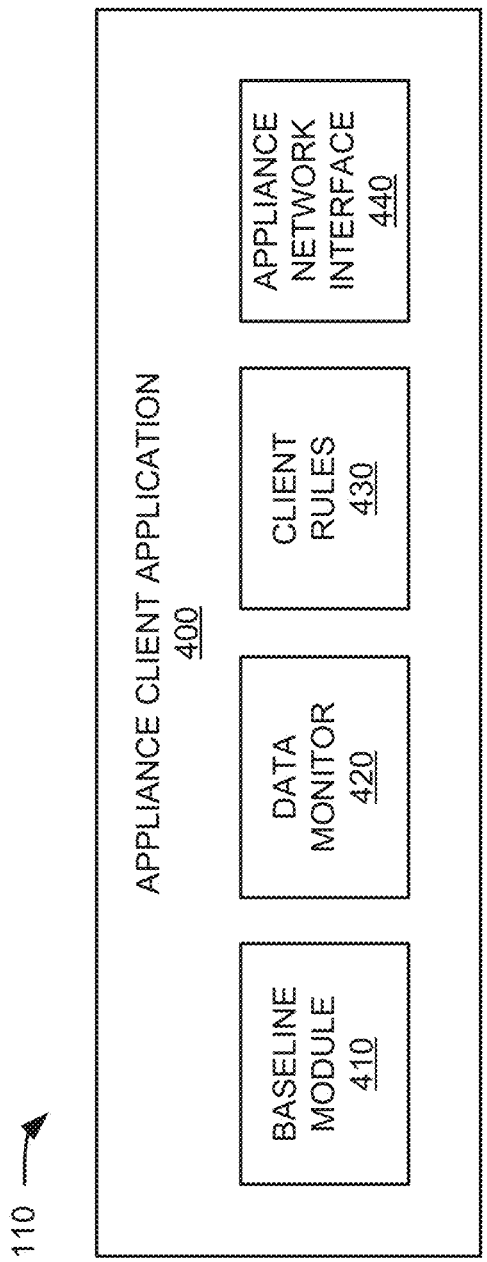
FIG. 4 is a block diagram of exemplary functional components of the monitored customer device of FIG. 1.

FIG. 4 is a diagram of exemplary functional components of monitored device 110. The functional components may be implemented by, for example, processing unit 210 in conjunction with memory 220. As shown in FIG. 4, monitored device 110 may include an appliance client application 400 that includes a baseline module 410, a data monitor 420, client rules 430, and an appliance network interface 440.

Generally, client application 400 may provide a user interface to register new monitored devices 110, identify baseline control limits for monitored device 110, establish data monitoring parameters for monitored device 110, and transmit registration, baseline, and/or monitoring data to rules server 150 or other devices. Client application 400 may be provided to monitored device 110 from, for example, web server 190, another device via network 195, or a third-party system (e.g., a digital media store). Although described in the context of monitored device 110, maintenance client application 400 may also be included on other devices, such as user device 130.

Baseline module 410 may identify baseline control limits for monitored device 110 after installation/placement of monitored device 110 in the customer premises. Baseline module 410 may take a "snapshot" of a current state of performance-indicating data (or control data) that may be collected from sensors and/or system monitoring tools. In one implementation, the performance-indicating data may correspond to data-types for which OEM or service provider recommended ranges are available. The time period for the snapshot may vary based on the type of monitored device 110 and control data. In one implementation, the time period for the snapshot may be included in a client rule for monitored device 110. Baseline module 410 may obtain an OEM or service provider baseline for a particular monitored device 110 to compare with the collected control data. Thus, baseline module 410 may identify a customer baseline for the particular monitored device 110 that may, for example, fall within (or near) a larger control limit range based on OEM or service provider specifications. Performance indicating data may include, for example, any data that can be captured by monitored device 110 and provided over a network to indicate performance and/or efficacy of a device/system. Particular performance indicating data may include, for example, a signal-to-noise ratio, a data rate over a particular network segment, temperature, water levels, pressures, engine speeds, efficiency ratings, etc.

Figure 5:
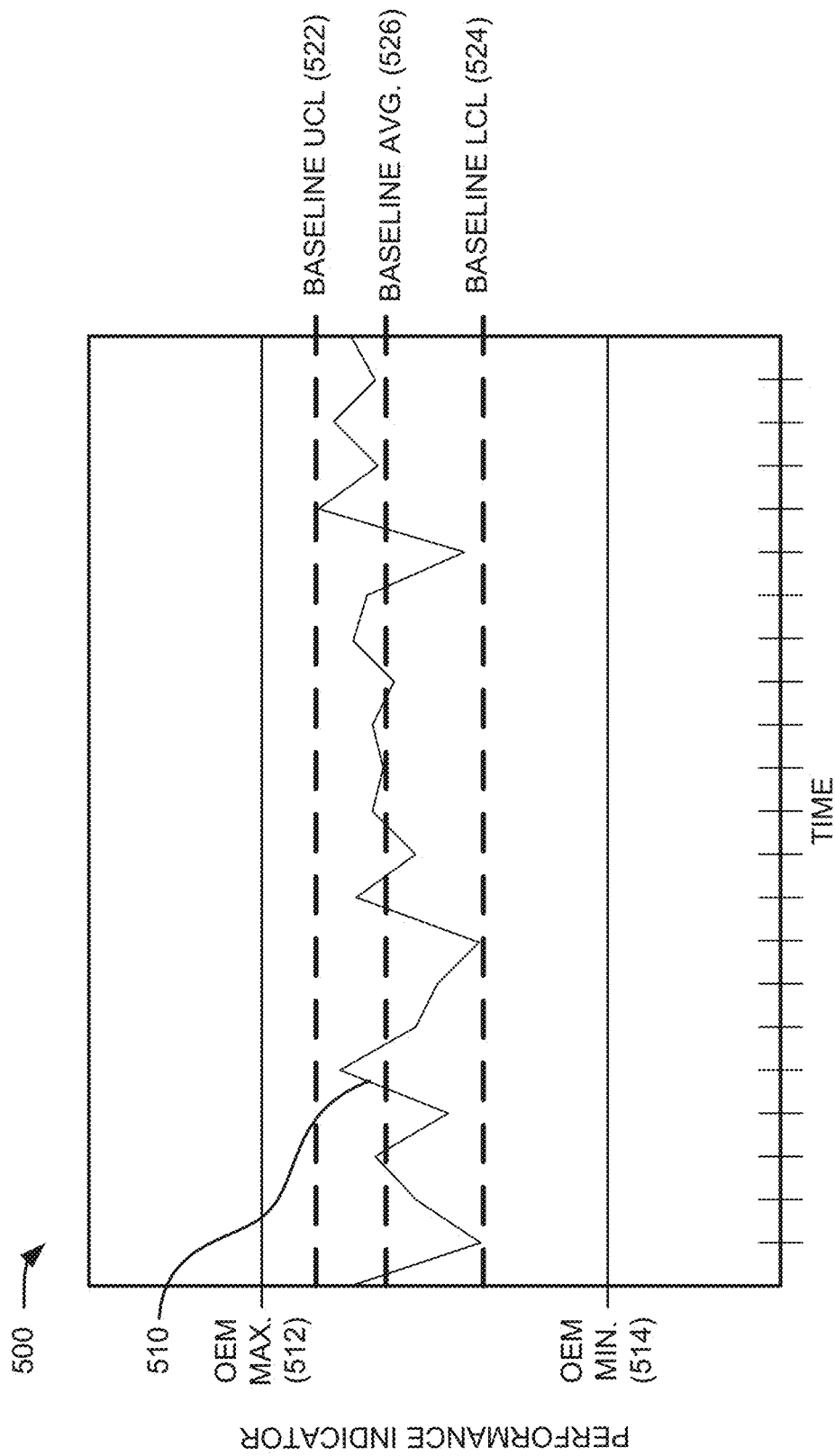
FIG. 5 is a diagram illustrating data to establish an installed baseline for a particular monitored customer device.

FIG. 5 is a diagram illustrating graph 500 of data to establish an installed baseline for a particular monitored device 110. A performance indicator (e.g., temperature, data rate, etc.) may be plotted against an appropriate time interval to provide a data plot 510 of initial performance for monitored device 110. Data plot 510 may fall within expected OEM control limits, OEM maximum 512 and OEM minimum 514, which would indicate a proper installation and initial performance of monitored device 110. Data plot 510 may also have measured maximum value and a measure minimum value within the time interval. Data plat 510 may also delineate an average. The maximum value may be taken as a baseline upper control limit (UCL) 522 and the minimum value may be taken as a baseline lower control limit (LCL) 524 for the particular monitored device 110 as installed in the customer premises. In one implementation, a baseline average 526 may also be stored, based on the average of data plot 510. Using information as schematically depicted in FIG. 5, baseline module 410 may identify a customer baseline of baseline UCL 522, baseline LCL 524, and baseline average 526 for a particular monitored device 110 falls within OEM maximum 512 and OEM minimum 514.

Returning to FIG. 4, data monitor 420 may collect and/or compare data samples from sensors on monitored device 110. In one implementation, data monitor 420 may collect data to determine baseline values, such as baseline UCL 522, baseline LCL 524, and baseline average 526. In another implementation, data monitor 420 may allow a user to configure the customer baseline. In still another implementation, data monitor 420 may dynamically adjust or reset the customer baselines based on continuing data collection and/or instructions from another device (e.g., user device 130, rules server 150, etc.). Data monitor 420 may also collect periodic intervals of data (e.g., raw data) to provide to other devices in network environment 100.

In another implementation, data monitor 420 may apply local client rules (e.g., from client rules 430) to identify when to send device data and/or messages to other devices in network environment 100. For example, data monitor 420 may follow rules to upload data at intervals indicated in client rules 430 or when an out-of-bounds event occurs. An "out-of-bounds event" (or simply an "event") may include, for example, a certain number of detected instances outside of baseline UCL 522 or baseline LCL 524, as indicated in client rules 430. Data monitor 420 may obtain information relating to a detected event, such as, for example, an event name, a timestamp, and/or one or more other event parameters, and may include the event information in an event notification associated with the event.

Client rules 430 may include stored instructions, a database, or another data structure to store client rules for monitoring and reporting data/events associated with monitored devices 110. In one implementation, client rules 430 may pre-configured for each monitored device 110, such that the client rules may simply be applied to baseline UCL 522 and baseline LCL 524, when identified and/or updated after installation of monitored device 110. In another implementation, client rules 430 may be provided/updated via user input to appliance client application 400 or downloads from a user device 130. For example, a customer may provide customized client rules associated with his/her particular preferences.

Appliance network interface 440 may be configured to communicate with an appliance network interface located in another device in network environment 100. For example, appliance network interface 440 may implement one or more communication protocols to enable devices on an appliance network to communicate. Each monitored device 110 may be identified by an appliance network device ID and one or more addresses that may be used to reach the device. The addresses may include an Internet Protocol (IP) address, a Media Access Control (MAC) address, and/or another kind of address. Appliance network interface 440 may enable data monitor 420 to report events and/or upload data periodically to other devices, such as rules server 150.

Figure 6:
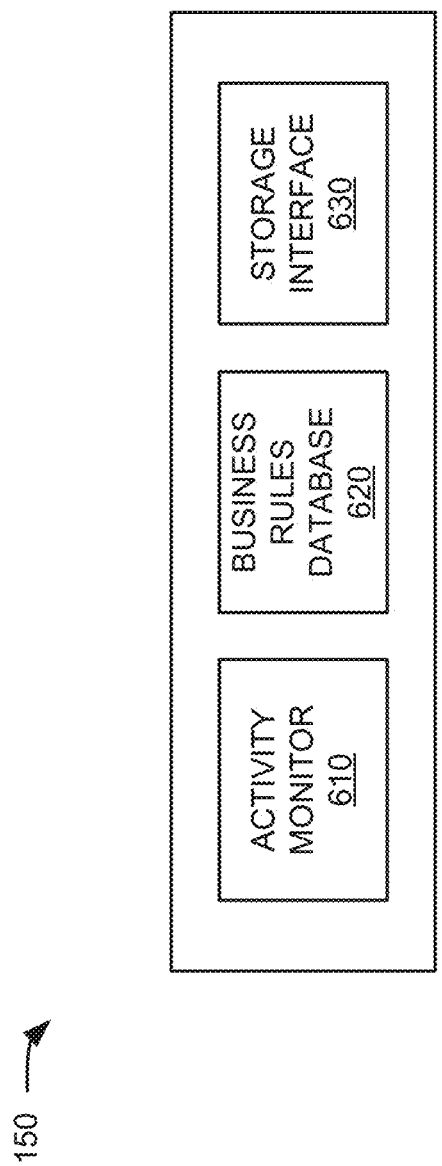
FIG. 6 is a block diagram of exemplary functional components of the rules server of FIG. 1.

FIG. 6 is a diagram of exemplary functional components of rules server 150. The functional components may be implemented by, for example, processor 320 in conjunction with memory 330. As shown in FIG. 6, rules server 150 may include an activity monitor 610, a business rules database 620, and a storage interface 630.

Activity monitor 610 may receive event notifications and/or data uploads from monitored devices 110. In one implementation, activity monitor 610 may monitor reported events and/or data against individual business rules associated with a particular consumer. In another implementation, activity monitor 610 may monitor reported events and/or data against business rules for multiple monitored devices 110 or for multiple consumers. Based on rule lookups (e.g., in business rules database 620), activity monitor 610 may initiate responsive actions—such as notification of customers, vendors, and/or warranty partners—when event notifications meet rule criteria. In other implementations, activity monitor 610 may initiate automated diagnostic or maintenance actions based on rule lookups.

Business rules database 620 may include a database or another data structure to store rules for monitoring data/events associated with monitored devices 110 and/or consumers. In one implementation, business rules database 620 may store rules associated with a particular monitored device or a particular customer. In another implementation, business rules database 620 may store rules across multiple monitored devices and/or customers. For example, business rules database 620 may include rules that may help determine if several event notifications may be related to a problem outside the customer premises (e.g., power outage, network problems, etc.) or a consistent problem with a particular type of monitored device 110. In one embodiment, business rules database 620 may be included within a cloud-based storage system of multiple networked devices.

Business rules database 620 may also include particular notifications and/or actions that may be performed when an out-of-bounds event is detected by activity monitor 610. Actions responsive to the out-of-bounds event may include, for example, notifying a customer (e.g., of an issue, device state, warranty status, recommended corrective actions, etc.), notifying a manufacturer or service provider, taking a proactive action (e.g., auto-shut down, reboot, schedule a service call under warranty, initiate a replacement part order for warranty parts, etc.). In one implementation, business rules 620 may be generated/update by customer input (e.g., via monitored device 110 and/or user device 130) or by service provider/vendor input.

Storage interface 630 may be configured to communicate with storage interfaces located in another device in network environment 100. For example, storage interface 630 may allow rules server 150 to process event notifications and/or data from monitored devices 110 and store the event notifications and/or data in another storage location (e.g., associated with event notifications and/or data from other monitored devices 110 of other customers).

Figure 7:
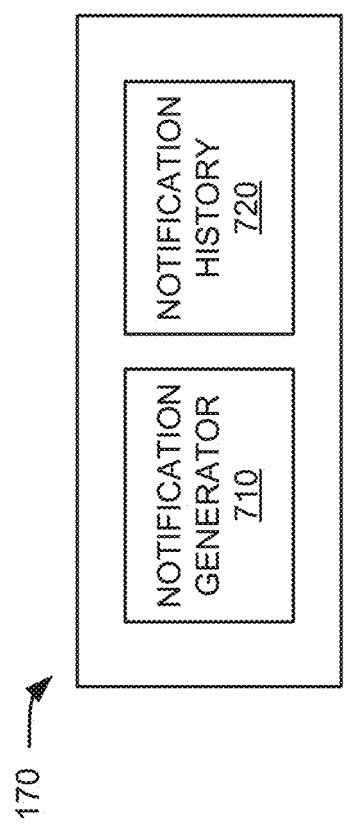
FIG. 7 is a block diagram of exemplary functional components of the notification server of FIG. 1.

FIG. 7 is a diagram of exemplary functional components of notification server 170. The functional components may be implemented by, for example, processor 320 in conjunction with memory 330. As shown in FIG. 7, notification server 170 may include a notification generator 710 and a notification history 720.

Notification generator 710 may receive an indication from rules server 150 of an actionable event and provide a notification to customers, customer support systems, or other systems based on instructions from rules server 150. In one implementation, notification server 170 may provide notifications in one or multiple formats. In one implementation, notifications may be directed for presentation to a user/technician. In another implementation, notifications may include instructions for monitored devices 110.

Notification history 720 may log notifications sent by notification generator 710 and/or forward a record of an event notification to customer/appliance database 160 or another device.

Figure 8:
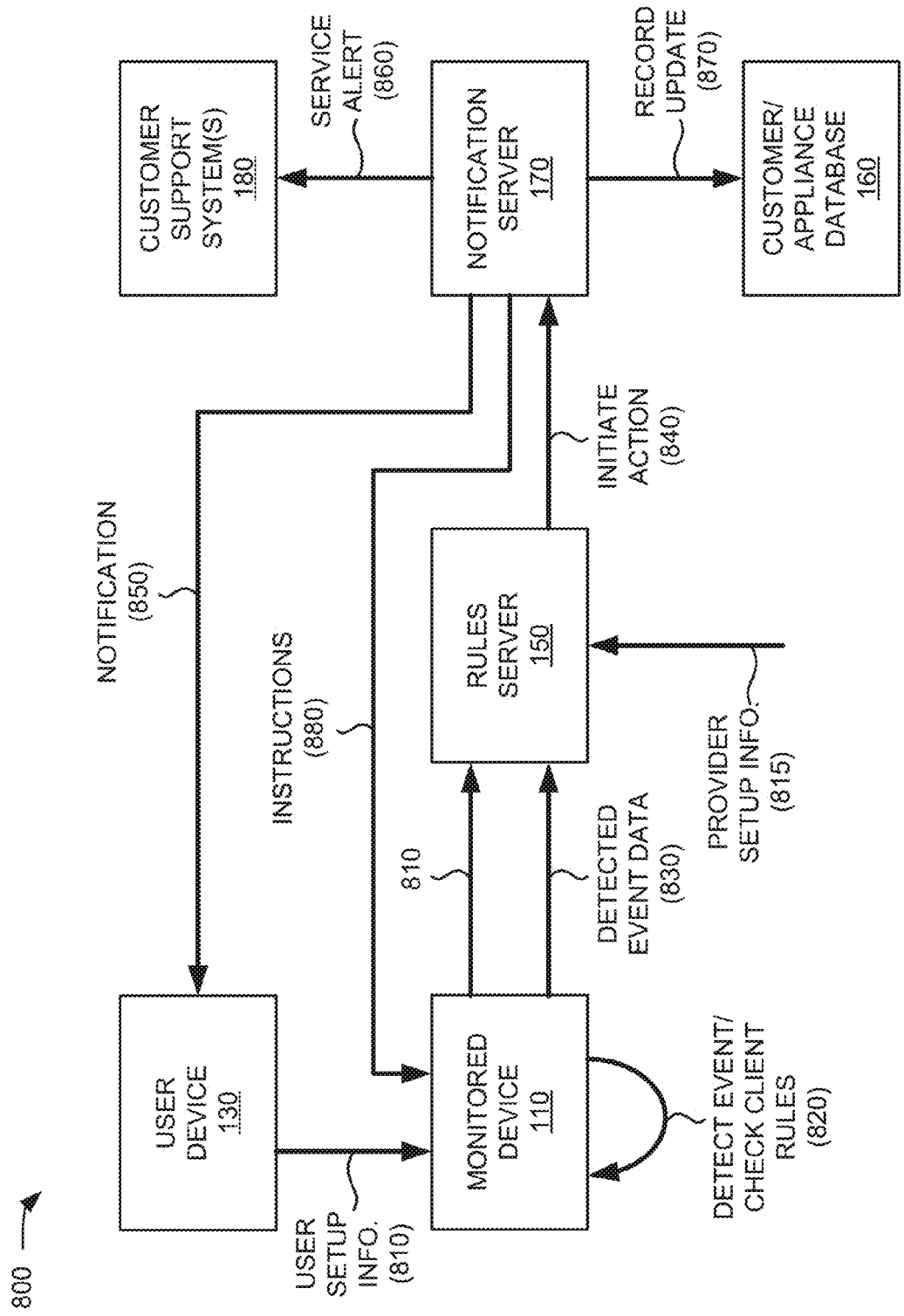
FIG. 8 is a diagram of exemplary communications among devices in a portion of the network environment of FIG. 1.

FIG. 8 is a diagram of exemplary communications among devices in a portion 800 of network environment 100. Communications in FIG. 8 may represent communications for monitoring monitored devices 110 and reporting actionable events. As shown in FIG. 8, network portion 800 may include monitored device 110, user device 130, rules server 150, customer/appliance database 160, notification server 170, and customer support system(s) 180. monitored device 110, user device 130, rules server 150, customer/appliance database 160, notification server 170, and customer support system(s) 180 may include features described above in connection with, for example, FIGS. 1-7.

As shown in FIG. 8, monitored device 110 may receive user setup information 810. In one implementation, user setup information 810 may provided via user device 130. In another implementation, monitored device 110 may include a user interface to receive user setup information 810 from a user without the need for user device 130. User setup information 810 may include, for example, customer authorizations, contact information, notification preferences, and/or rules. Rules may include local client rules (e.g., if not already pre-set) for monitored 110 and rules for implementation by rules server 150. In one implementation, user setup information 810 may also include guidelines or permission to detect a UCL (e.g., baseline UCL 522) and a LCL (baseline 524) for monitored device 110. Monitored device 110 may forward some or all of user setup information 810 to rules server 150.

In addition to user setup information 810, rules server 150 may receive provider setup information 815. Provider setup information 815 may include business rules for managing data received from monitored device 110 and other monitored devices. For example, provider setup information 815 may identify rules for automated notifications (e.g., in addition to those indicated in user setup information 810), automated diagnostics, monitoring, wait periods, actionable event triggers, etc.

Based on user setup information 810, monitored device 110 may monitor sensor data from monitored device 110 to detect an event and/or apply local client rules to monitored data, as indicated by reference 820. When data indicates that an out-of-bounds event has occurred, monitored device 110 may provide detected event data 830 to rules server 150.

Figure 9:
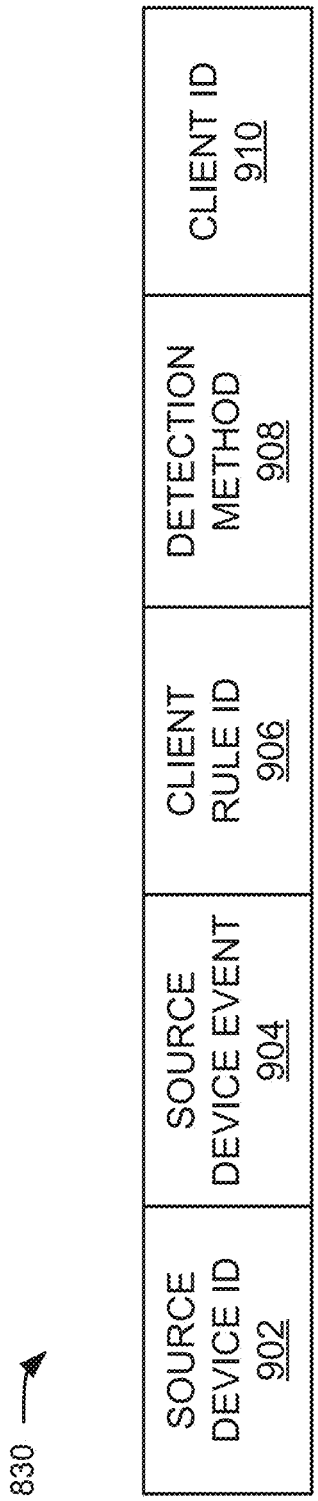
FIG. 9 is a diagram of exemplary fields of a detected event data message of FIG. 8.

FIG. 9 is a diagram of exemplary fields of detected event data 830. As shown in FIG. 9, detected event data 830 may include, for example, a source device ID field 902, a source device event field 904, a client rule ID field 906, a detection method field 908, and a client ID field 910.

Source device ID field 902 may include an appliance network device ID or address that may correspond to a particular monitored device 110. Source device event field 904 may include a descriptor of detected event data 830, which may include an error code or selection from a preset word-set. In another implementation, source device event field 904 may include actual data and, if needed, cross-references to control limits such as baseline UCL 522 and baseline LCL 524. Client rule ID field 906 may include an identifier, if applicable, of the rule that triggered sending detected event data 830. Detection method field 908 may include an indication of a sensor, an alarm, or another mechanism or method that enabled detection of detected event data 830. Client ID field 910 may include a customer identifier, such as an account ID, email address, or the like, to associate a customer with detected event data 830. Although FIG. 9 shows exemplary fields for detected event data 830, in other implementations, detected event data 830 may include fewer, additional, or different fields than shown in FIG. 9.

Returning to FIG. 8, rules server 150 may apply business rules (e.g., based on setup information 810, provider setup information 815, and/or other rules) to detected event data 830 to verify if detected event data 830 constitutes an actionable event and/or what actions can be taken when detected event data 830 constitutes an actionable event. In one example, rules server 150 may determine if a particular number of instances, type of instances, or frequency of instances of detected event data 830 warrant a notification to either a customer (e.g., via user device 130) or customer support personnel (e.g., via customer support system 180). In another example, rules server 150 may treat any detected event data 830 as an actionable event and apply business rules to identify particular notification, monitoring, diagnostic, and/or corrective actions.

If rules server 150 determines that detected event data 830 constitutes an actionable event, rules server 150 may provide an initiate action message 840 to notification server 170. Initiate action message 840 may be based on rules in rules server 150 and include, for example, particular actions to take and/or particular notifications to be sent. In some implementation, initiate action message 840 may provide instructions for heightened monitoring, request for a service call, assignment to a particular technician or technical group, guidance to send to the customer, etc.

Based on initiate action message 840, notification server 170 may provide one or more of a notification 850, a service alert 860, a record update 870, or instructions 880. Notification 850 may be provided to a user device 130 or an account associated with the user of monitored device 110. Notification 850 may include, for example, an indication of the monitored device 110, a problem (or potential problem) description, recommended corrective actions, and/or monitoring actions. Corrective actions may include, for example, actions/instructions for the customer to perform (e.g., reset/unplug a device, adjust a setting, etc.), actions that were/will be performed over the network (e.g., software updates, etc.), or actions to notify a technician.

Service alert 860 may signal a technician or account associated with customer support system 180. Service alert 860 may include, for example, some or all of the information in detected event data 830. In one implementation, service alert 860 may be directed to a particular customer service department that is assigned to address a category of event (e.g., based on source device event field 904, client rule ID 906, and/or detection method field 908). In general, service alert 860 may include information sufficient to enable customer support system 180 to contact a user associated with monitored device 110 and/or schedule a service call.

Record update 870 may send, to customer/appliance database 160, an indication of some or all of the information in detected event data 830. Record update 870 may be used to update a client profile or device record associated with monitored device 110. In one implementation, information from record update 870 may be accessed by or provided to vendors to support warranty claims, recalls, or gather data about product service issues.

Instructions 880 may include instructions/signals to initiate actions that may be performed by monitored device 110 to perform diagnostic or maintenance activities that may resolve detected out-of-bounds events. For example, instructions 880 may initiate an auto-shut down, a reboot, a software download, etc. In some implementations, instructions 880 may include a use notification and/or override option.

Figure 10:
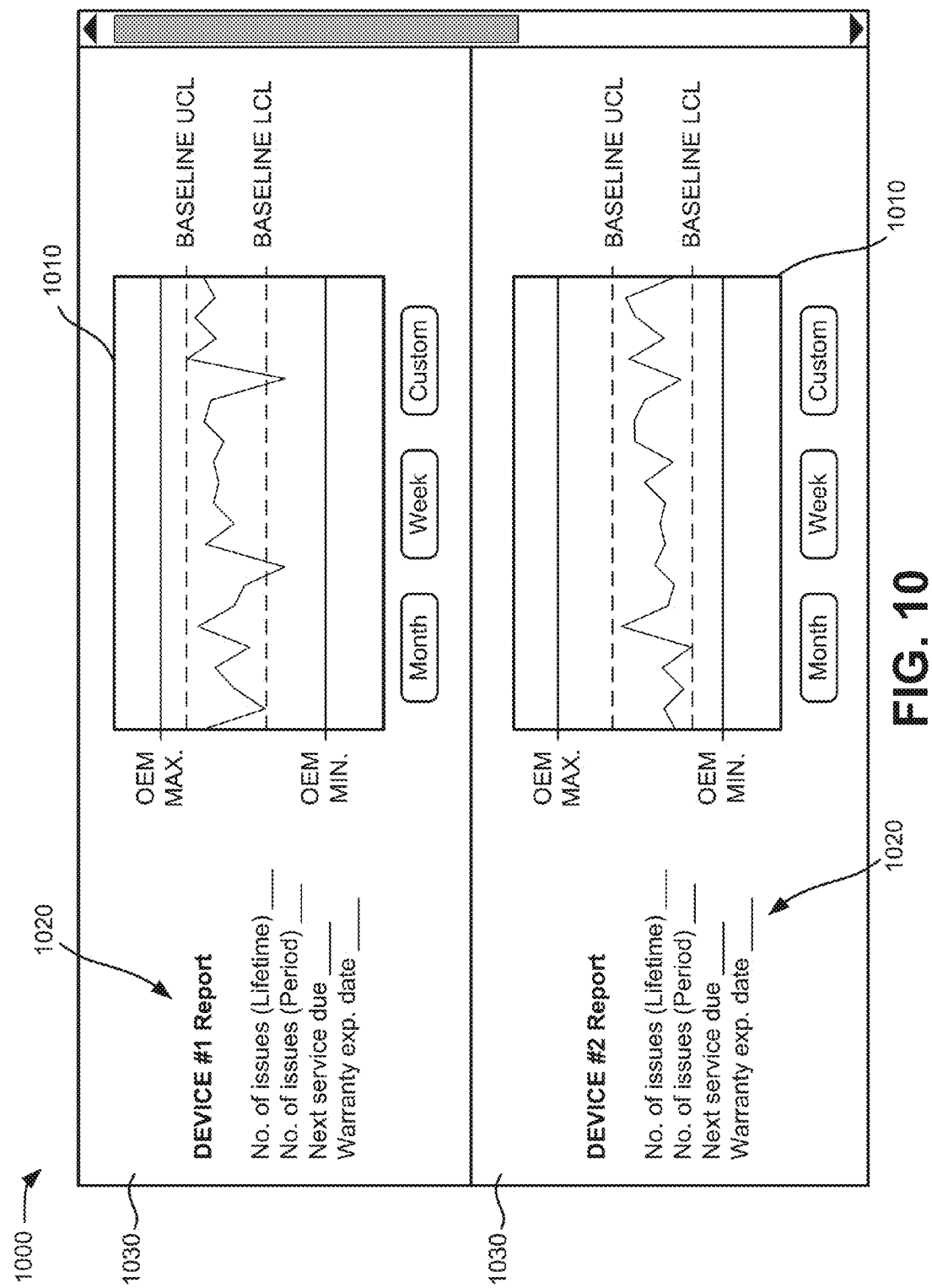
FIG. 10 is a diagram of an exemplary customer user interface capable of being generated by one of the user devices depicted in FIG. 1.
Figure 11:
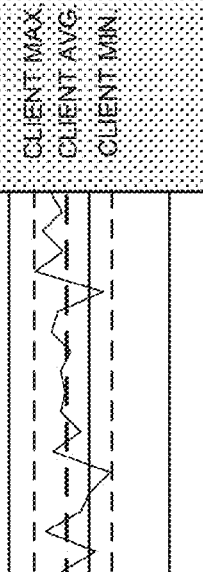
FIG. 11 is a diagram of an exemplary vendor user interface capable of being generated by one of the user devices depicted in FIG. 1.

Referring to FIGS. 10 and 11, data from monitored device 110 may be collected and/or stored by backend devices (e.g., customer appliance database 160) and may be made accessible to users and/or vendors via web server 190. FIG. 10 is a diagram of an exemplary customer reporting interface 1000 capable of being presented by one of user devices 130, and FIG. 11 is a diagram of an exemplary vendor user interface 1100 capable of being presented by one of user devices 130 or customer support system 180.

Referring to FIG. 10, customer reporting interface 1000 may provide charts for each monitored device 110 associated with a particular user account. After providing appropriate login credentials, user device 130 may retrieve customer reporting interface 1000. Customer reporting interface 1000 may include graphs 1010 of data for a particular monitored device 110. For each monitored device 110, control data may be plotted for a particular period (e.g., month, week, or a customized range). The control data may be plotted against the OEM or service provider recommended limits (e.g., OEM maximum 512 and OEM minimum 514) and local baseline values (e.g., baseline UCL 522 and baseline LCL 524) described above with respect to FIG. 5. The control data may be plotted in a single chart for each monitored device (as shown in FIG. 10), or as separate charts of OEM and local baselines.

In one implementation, customer reporting interface 1000 may also include summary information 1020, which may be extracted from customer appliance database 160. Summary information 1020 may include the number of events reported over the device lifetime and/or the selected reporting period for a monitored device 110. Summary information 1020 may also include service schedule information (e.g., last service, next recommended service date, etc.) and/or warranty information (e.g., warranty expiration date) for each monitored device 110. In one implementation, graphs 1010 and summary information 1020 for each monitored device 110 may be grouped together in a single report item 1030 that can be sorted based on various fields within the report items 1030.

Referring to FIG. 11, vendor reporting interface 1100 may provide a dashboard for tracking customer monitored devices 110. Vendor reporting interface 1100 may include a search section 1110 to identify particular monitored devices 110 and a sorting section 1120 to order the presentation of report items 1130. Similar to report items 1030, report items 1130 may each include graphs 1010 of data for a particular monitored device 110 plotted against OEM control limits and local baseline values described above.

In one implementation, report items 1130 may be color-coded and/or sorted based on issue priorities. Priorities may be based on, for example, rules provided to rules server 150. For example, report items 1130 with actionable events requiring corrective action may be color-coded red and/or sorted with a highest ranking, while report items 1130 with actionable events requiring continued monitoring may be color-coded yellow and/or sorted with a medium ranking above report items 1130 that have no actionable events. In another implementation, service providers may prioritize service calls based on priorities assigned/presented in vendor reporting interface 1100.

In another implementation, report items 1130 may be sorted based on other criteria, such as customer, device type, location (e.g., town, zip code, etc.), or other customizable settings. Report items 1130 may also include summary information 1020 that may be used in sorting report items 1130. Generally, vendor reporting interface 1100 may provide vendors a mechanism to identify service degradation and other problem trends before they become warranty issues (e.g., with performance outside OEM or service provider recommended limits).

Although FIGS. 10 and 11 depict exemplary user interfaces, in other implementations, these user interfaces may depict more, less, different and/or differently-arranged information than depicted in FIGS. 10 and 11.

Figure 12:
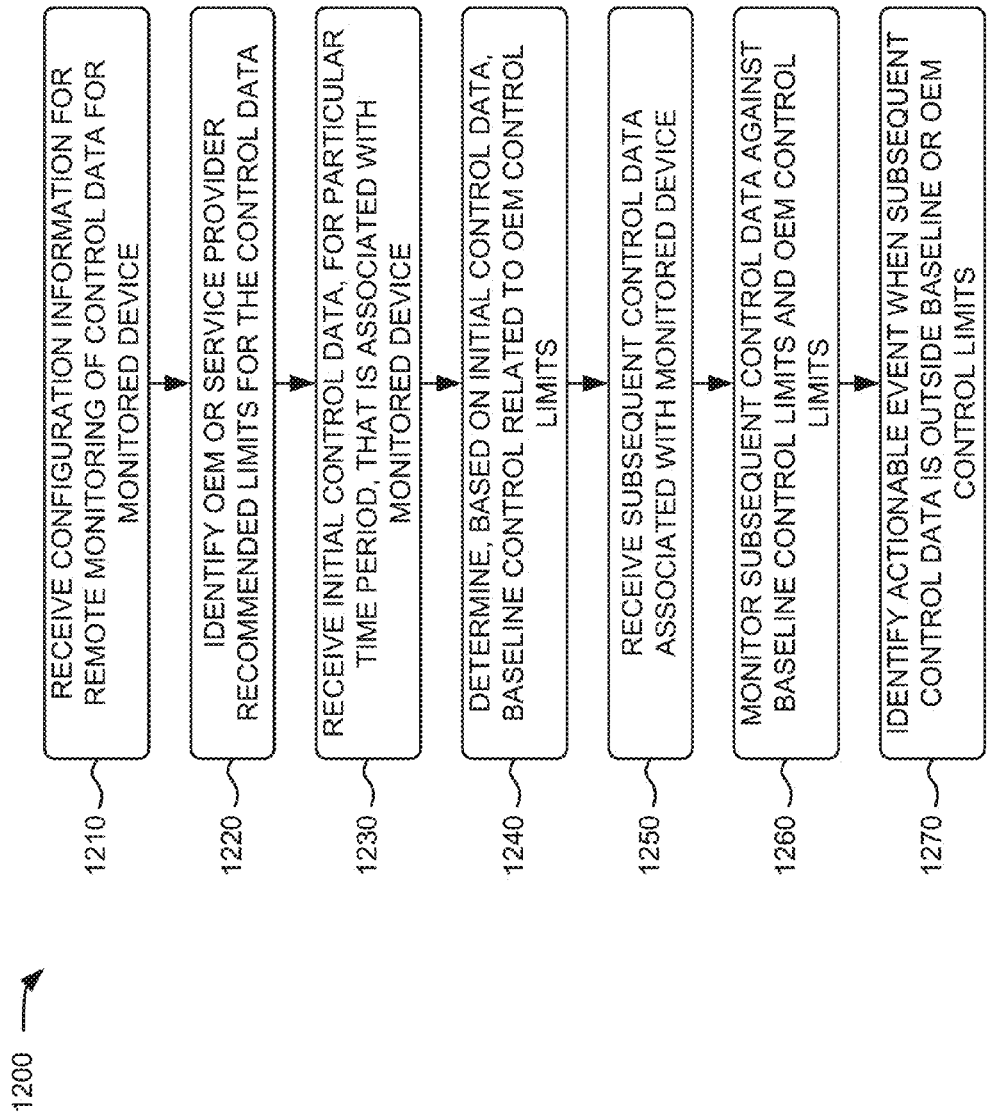
FIG. 12 is a flow diagram that illustrates an exemplary process for monitoring in-home customer devices, according to an implementation described herein.

FIG. 12 is a flow diagram that illustrates an exemplary process 1200 for monitoring in-home customer devices. In one implementation, process 1200 may be implemented by rules server 150. In another implementation, process 1200 may be implemented by rules server 150 in conjunction with one or more other devices in network environment 100, such as monitored device 110, user device 130, and/or notification server 170.

Process 1200 may include receiving configuration information for remote monitoring of control data for a monitored device (block 1210). For example, rules server 150 may receive configuration information from monitored device 110 and/or user device 130 when a user sets up monitored device 110 for monitoring within network environment 100. The configuration information may include business rules for responding to an event when the control data is outside baseline control limits.

Process 1200 may also include identifying OEM or service provider recommended limits for the control data (block 1220). For example, rules server 150 may obtain values for expected OEM control limits, such as OEM maximum 512 and OEM minimum 514, which would indicate a proper installation and initial performance of monitored device 110. The OEM control limits may be provided, for example, from participating manufactures, customer support system(s) 180, and/or stored in customer/appliance database 160.

Process 1200 may further include receiving initial control data for a particular time period and associated with the monitored device (block 1230) and determining, based on the initial control data, baseline control limits related to the OEM control limits (block 1240). For example, monitored device 110 may provide, to rules server 150, initial performance data for an indicator (e.g., temperature, data rate, etc.) over an appropriate time interval to provide data plot 510. Data plot 510 may yield baseline UCL 522 and baseline LCL 524 for the particular monitored device 110, as installed in the customer premises. In one implementation, baseline UCL 522 and baseline LCL 524 may be validated based on a comparison to the corresponding OEM control limits. For example, baseline UCL 522 and baseline LCL 524 may be validated if within the range of the maximum and minimum OEM control limits. As another example, baseline UCL 522 and baseline LCL 524 may be validated if within a particular margin of error of the maximum and minimum OEM control limits. Rules server 150 may identify baseline UCL 522 and baseline LCL 524 from the initial control data, or rules server 150 may be provided with baseline UCL 522 and baseline LCL 524 directly. In other implementations, other control data, such as baseline average 526, may also be included.

Process 1200 may further include receiving subsequent control data associated with the monitored device (block 1250) and monitoring the subsequent control data against the baseline control limits and the OEM control limits (block 1260). For example, after an initial configuration, monitored device 110 may collect data from local sensors and provide the raw data and/or event data (e.g., detected event data 830) to rules server 150. Rules server 150 (e.g., activity monitor 610) may receive the raw data uploads and/or event notifications from monitored devices 110. In one implementation, activity monitor 610 may monitor reported events and/or raw data against individual rules associated with a particular customer. In another implementation, activity monitor 610 may monitor reported events and/or raw data against rules for multiple monitored devices 110 or for multiple customers.

Process 1200 may additionally include identifying, based on the business rules, an actionable event when the subsequent control data is outside the baseline control limits (block 1270). For example, in one implementation, rules server 150 may apply business rules to detected event data 830 to determine if detected event data 830 constitutes an actionable event. Rules server 150 may determine if a particular number of instances, type of instances, or frequency of instances of detected event data 830 warrant a notification to a customer (e.g., via user device 130), customer support personnel (e.g., via customer support system 180), or another entity (e.g., a warranty provider, etc.). In another implementation, rules server 150 may apply business rules to raw data from monitored devices 110.

Figure 13:
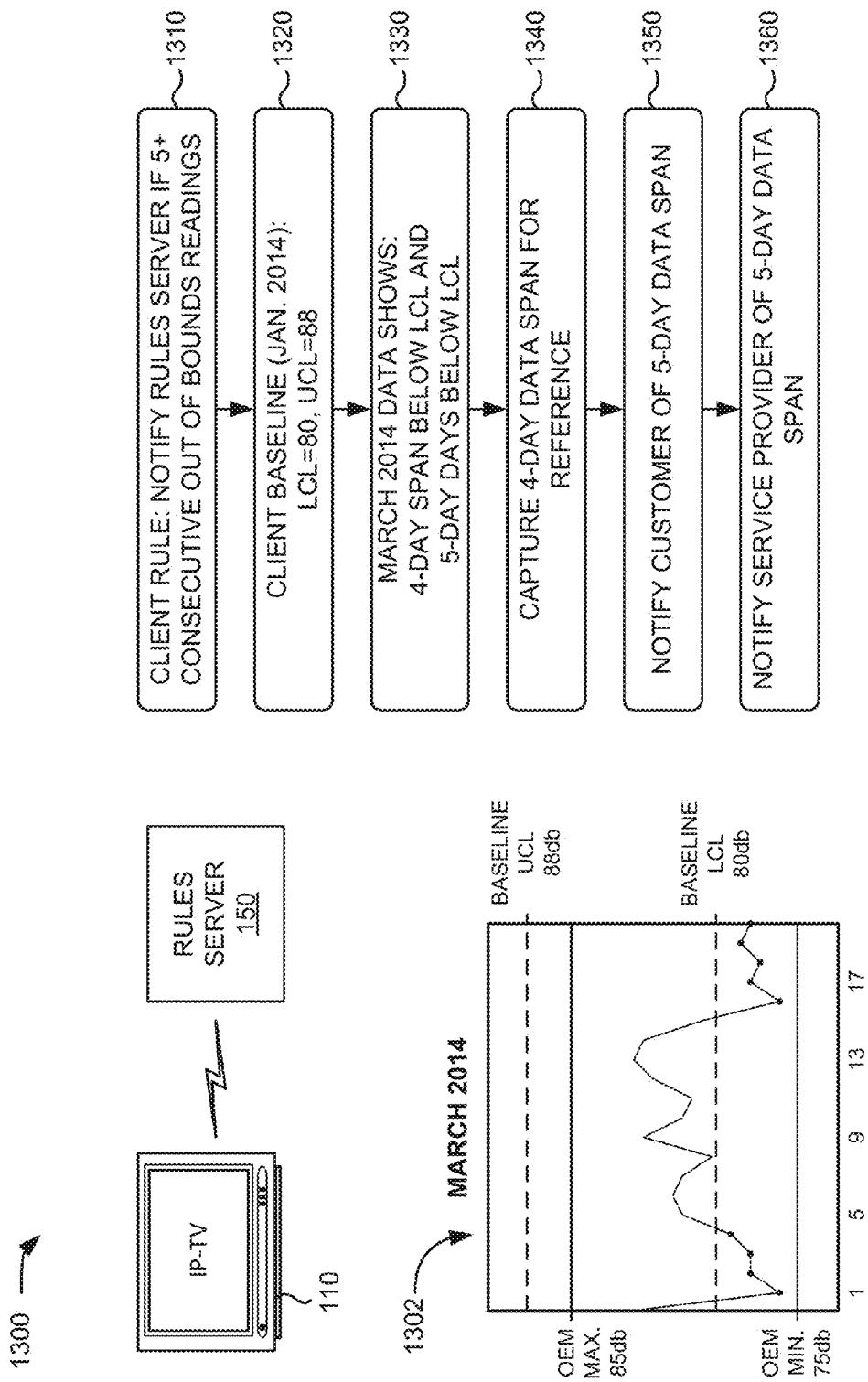
FIGS. 13-16 are diagrams of exemplary scenarios according to implementations described herein.

FIG. 13 is a diagram of an exemplary scenario 1300 according to an implementation described herein. As shown in FIG. 13, scenario 1300 includes a monitored device 110, an IP-TV, in communication with rules server 150. Data from IP-TV 110 is represented in graph 1302. Referring to block 1310, IP-TV 110 may be configured with a local client rule to notify rules server 150 if five or more consecutive out-of-bounds readings are detected. As shown in graph 1302 and block 1320, using the average daily received signal strength as a control value, a client baseline taken in January 2014 identifies a baseline LCL of 80 decibels and a baseline UCL of 88 decibels. These baseline values may correspond to guaranteed quality of service parameters provided by a service provider to the customer. As shown in graph 1302 and block 1330, data collected by IP-TV 110 in March 2014 identifies a 4-day span with values below the baseline LCL before the signal strength recovers and then a 5-day span with values below the baseline LCL later that month.

Based on the local client rule, IP-TV 110 may capture the 4-day data span for reference and/or periodic reporting as raw data (block 1340). However, the 4-day data span would not be provided to rules server 150 as a detected event (e.g., detected event data 830). In contrast, the 5-day data span would be provided to rules server 150 as detected event data 830. As indicated in blocks 1350 and 1360, business rules applied by rules server 150 may cause rules server to initiate notifications to the customer and a service provider (e.g., a provider of the IP-TV service).

Failures indicated by the 5-day data span could be due to changes in the customer's home network immediately preceding the out-of-bounds reading, a component failure, or regional/backend network changes. Based on business rules, rules server 150 can proactively initiate corrective action, saving costs of inbound customer calls. In some instances, proactive notifications by rules server 150 may prompt actions by the customer (e.g., "please reboot router") or a service provider (e.g., pointing to 'error code' in some component.)

Figure 14:
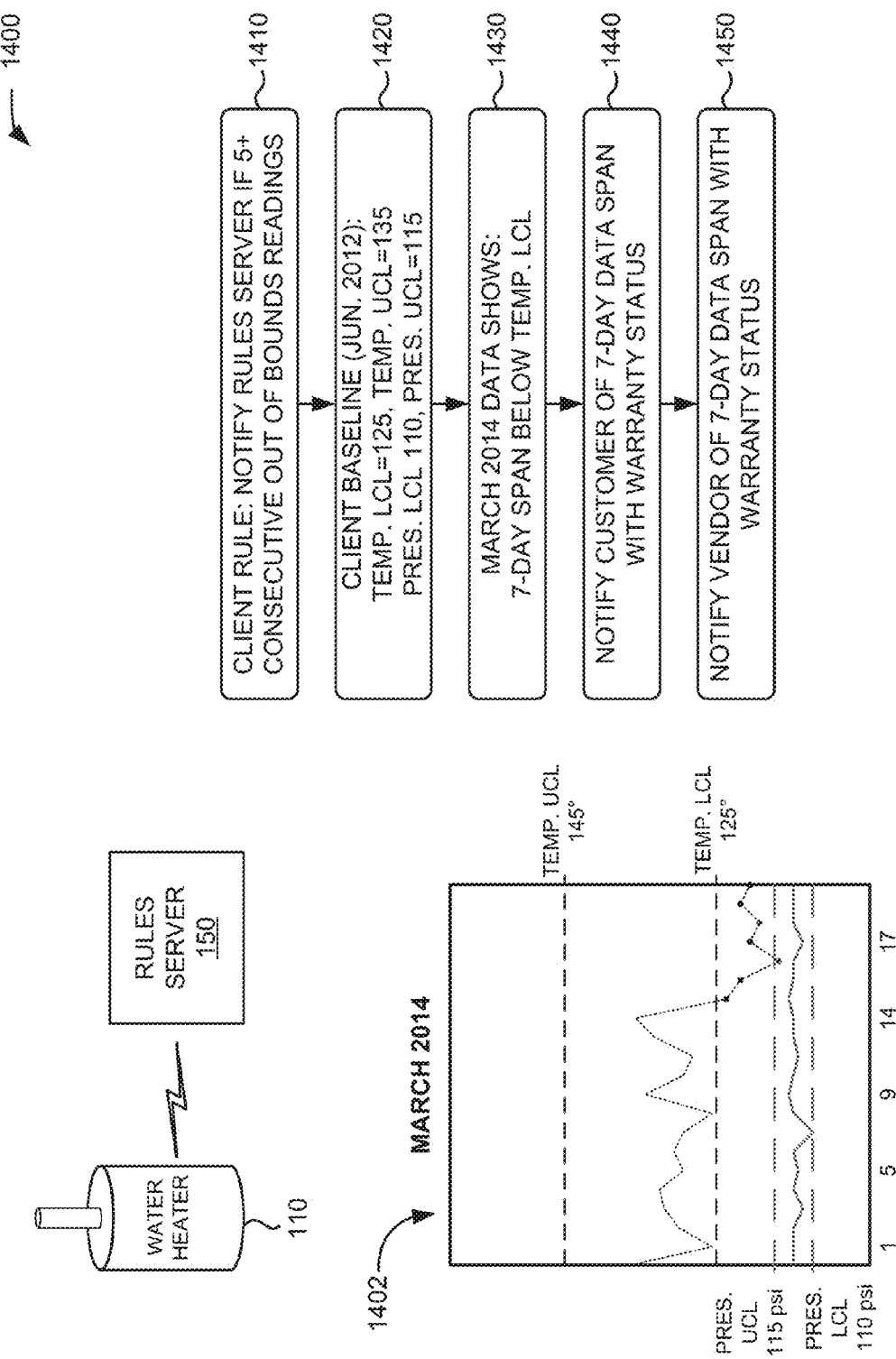

FIG. 14 is a diagram of an exemplary scenario 1400 according to another implementation described herein. As shown in FIG. 14, scenario 1400 includes a monitored device 110, a water heater, in communication with rules server 150. Data from water heater 110 is represented in graph 1402. Referring to block 1410, water heater 110 may be configured with a local client rule to notify rules server 150 if five or more consecutive out-of-bounds readings are detected. As shown in graph 1402 and block 1420, using both the average daily pressure and temperature readings as control values, a client baseline taken in June 2012 identifies a baseline temperature LCL of 125 degrees (Fahrenheit) and a baseline temperature UCL of 145 degrees. Also, the client baseline identifies a baseline pressure LCL of 110 psi and a baseline pressure UCL of 115 psi. As shown in graph 1402 and block 1430, data collected by water heater 110 in March 2014 identifies a 7-day span with values below the baseline temperature LCL.

Based on the local client rule, water heater 110 may capture the 7-day data span and report to rules server 150 as a detected event (e.g., detected event data 830), as indicated in block 1430. As indicated in blocks 1440 and 1450, business rules applied by rules server 150 may cause rules server 150 to initiate notifications to the customer and a vendor (e.g., a water heater vendor for water heater 110).

Failures indicated by the 7-day data span could be due to, for example, a degrading heating component or damaged insulation. Based on business rules, rules server 150 can proactively initiate corrective action by providing recommendations to the customer, including investigating if changes to the customer premises occurred just prior to the date of the out-of-bounds readings. In some instances, based on business rules, rules server 150 may include warranty status (e.g., warranty coverage and/or expiration dates) in the notifications to either the customer or vendor.

Figure 15:
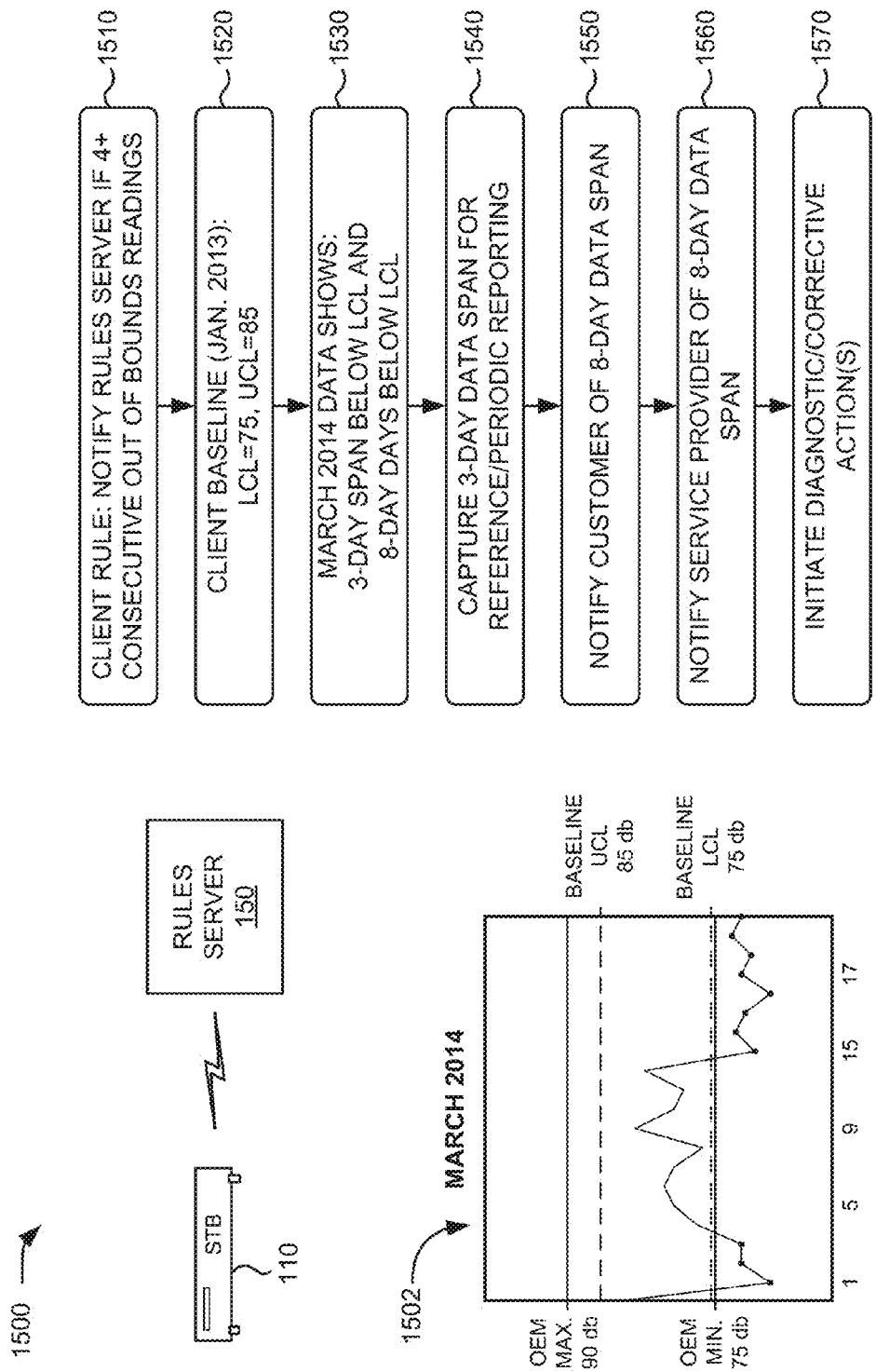

FIG. 15 is a diagram of an exemplary scenario 1500 according to yet another implementation described herein. As shown in FIG. 15, scenario 1500 includes a monitored device 110, a set-top box (STB), in communication with rules server 150. Data from STB 110 is represented in graph 1502. Referring to block 1510, STB 110 may be configured with a local client rule to notify rules server 150 if four or more consecutive out-of-bounds readings are detected. As shown in graph 1502 and block 1520, using a lowest daily received signal strength as a control value, a client baseline taken in January 2013 identifies a baseline LCL of 75 decibels and a baseline UCL of 85 decibels. These control limits may correspond to service-provider-guaranteed levels of service for STB 110. As shown in graph 1502 and block 1530, data collected by STB 110 in March 2014 identifies a 3-day span with values below the baseline LCL before the signal strength recovers and then an 8-day span with values again below the baseline LCL later that month.

Based on the local client rule, STB 110 may capture the 3-day data span for reference and/or periodic reporting as raw data (block 1540). However, the 3-day data span would not be provided to rules server 150 as a detected event. In contrast, the 8-day data span (e.g., four or more) would be provided to rules server 150 as detected event data 830. As indicated in blocks 1550 and 1560, business rules applied by rules server 150 may cause rules server 150 to initiate notifications to the customer and a service provider (e.g., a provider of television services via STB 110).

Failures indicated by the 8-day data span could be due to needed software changes in STB 110 or other factors. Assuming that STB 110 is a part of a closed system controlled by the same service provider that controls rules server 150, rules server 150 may initiate automated diagnostic or corrective actions for STB 110 (block 1570). For example, based on business rules, rules server 150 can initiate an "auto-reboot" command to reset STB 110. (In one implementation, a customer using STB 110 can delay/override the auto-reboot command.) Additionally, based on business rules, rules server 150 may target STB 110 for heightened scrutiny for three days after the reboot, and rules server 150 may perform additional maintenance actions, such as applying software updates, confirming subscription packages, performing additional reboots, etc., as necessary. The automated diagnostics may also allow the service provider to proactively take other corrective actions. For example, if automated diagnostics identify a hardware problem, the service provider may ship a new STB 110 without having to handle an inbound call/complaint from the customer.

Figure 16:
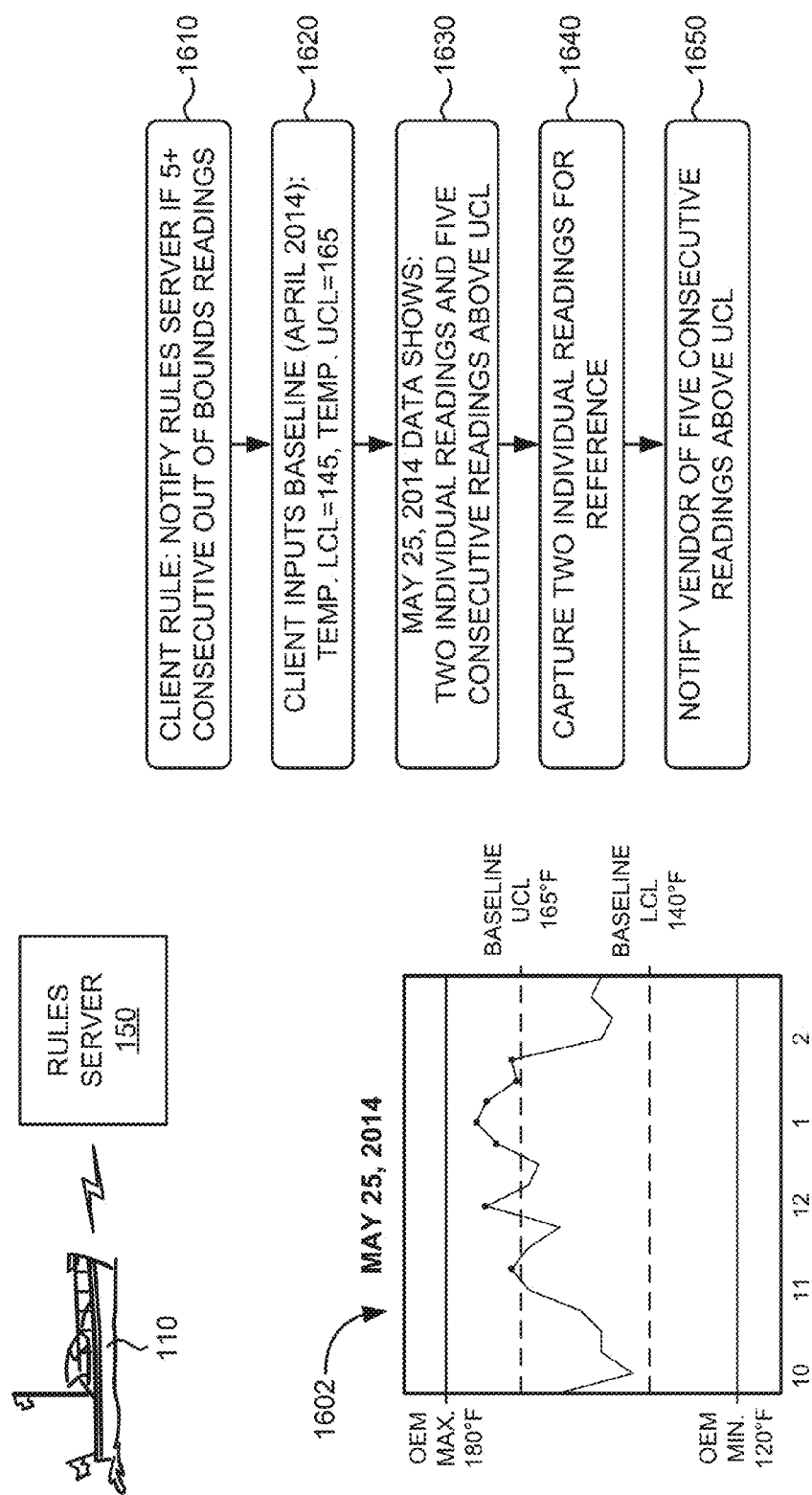

FIG. 16 is a diagram of an exemplary scenario 1600 according to still another implementation described herein. As shown in FIG. 16, scenario 1600 includes a monitored device 110, a boat telematics unit, in communication with rules server 150. Data from one component monitored by telematics unit 110 is represented in graph 1602. Referring to block 1610, telematics unit 110 may be configured with a local client rule to notify rules server 150 if five or more consecutive out-of-bounds readings are detected for the particular component. As shown in graph 1602, OEM recommended operating engine temperatures are between 120° F. and 180° F. As shown in graph 1602 and block 1620, using operating temperature as a control value, a client baseline input by the customer in April 2014 identifies tighter tolerances with a baseline LCL of 140° F. and a baseline UCL of 165° F. These baseline values may correspond, for example, to an optimal temperature for particular engine oil. As shown in graph 1602 and block 1630, data collected by telematics unit 110 on May 25, 2014 identifies two individual readings temporarily above the baseline UCL and then 5 consecutive readings with values above the baseline UCL.

Based on the local client rule, telematics unit 110 may capture the two individual reading for reference and/or periodic reporting as raw data (block 1640). The five consecutive readings would be provided to rules server 150 as a detected event (e.g., detected event data 830). As indicated in blocks 1650, business rules applied by rules server 150 may cause rules server to initiate notifications to the customer, but not to a vendor or service technician (e.g., since the temperatures did not exceed recommended OEM levels).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 12-16, the order of the blocks may be modified in other embodiments. Further, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device, configuration information for monitoring, via a network, control data for a monitored customer device, wherein the configuration information includes:
        an upper control limit and a lower control limit of the control data for the monitored customer device, the upper control limit and the lower control limit corresponding to a measured maximum value and minimum value over a particular time period when the monitored customer device is initially installed at a customer premises, and
        business rules for responding to an event where the control data is outside the upper control limit and the lower control limit;
    obtaining, by the network device and in response to receiving the configuration information, original equipment manufacturer (OEM) or service provider recommended limits for the control data;
    comparing, by the network device, the upper control limit and the lower control limit to the recommended limits;
    validating, by the network device, the upper control limit and the lower control limit to create a validated upper control limit and a validated lower control limit when the upper control limit and the lower control limit are within the recommended limits;
    storing, by the network device and in a memory, the validated upper control limit and the validated lower control limit associated with the monitored customer device;
    receiving, by the network device and from the monitored customer device, an indication of an out-of-bounds event, wherein the out-of-bounds event includes a device identifier for the monitored customer device, an event identifier, and a detection method for at least one instance where the control data is outside the validated upper control limit and the validated lower control limit;
    determining, by the network device and based on the business rules, whether the out-of-bounds event constitutes an actionable event; and
    initiating, by the network device and based on the business rules, the device identifier, the event identifier, and the detection method, an action responsive to the out-of-bounds event, when the out-of-bounds event constitutes the actionable event.

2. The method of claim 1, wherein the out-of-bounds event is defined based on a set of local client rules applied by the monitored customer device, and wherein the method further comprises:
    receiving, by the monitored customer device, the control data associated with the monitored customer device; and
    monitoring, by the monitored customer device, the control data against the validated upper control limit and the validated lower control limit to detect the out-of-bounds event.

3. The method of claim 1, wherein the action includes notifying a warranty provider for the monitored customer device.

4. The method of claim 1, further comprising:
    updating a record of the monitored customer device, associated with a customer, in a database.

5. The method of claim 4, further comprising:
    providing, to a user device, an interactive report from the database showing the control data in context of the validated upper control limit and the validated lower control limit.

6. The method of claim 5, wherein the interactive report further includes other control data for other monitored customer devices associated with a same customer.

7. The method of claim 5, wherein the interactive report further includes other control data for other monitored customer devices associated with different customers.

8. The method of claim 7, wherein the interactive report includes color-coding to indicate whether the control data for the monitored customer device or the other control data for the other monitored customer devices is outside the validated upper control limit or the validated lower control limit.

9. The method of claim 1, wherein the upper control limit and the lower control limit reflect installed conditions of the monitored customer device over a time period indicated in the configuration information.

10. The method of claim 9, wherein receiving the configuration information further comprises:
receiving, from the monitored device, a customer authorization, customer contact information, notification preferences, and local rules for detecting the out-of-bounds event for the monitored customer device, and
receiving, from a service provider, service schedules and warranty information for the monitored customer device.

11. The method of claim 1, wherein the action includes one or more of:
initiating an automated maintenance action for the monitored customer device, or
initiating a software upgrade for the monitored customer device.

12. A device, comprising:
a memory configured to store a plurality of instructions; and
a processor configured to:
receive configuration information for monitoring, via a network, control data for a monitored customer device, wherein the configuration information includes:
an upper control limit and a lower control limit of the control data for the monitored customer device, the upper control limit and the lower control limit corresponding to a measured maximum value and minimum value over a particular time period when the monitored customer device is initially installed at a customer premises, and
business rules for responding to an event where the control data is outside the upper control limit and the lower control limit;
obtain, in response to receiving the configuration information, original equipment manufacturer (OEM) or service provider recommended limits for the control data;
compare the upper control limit and the lower control limit to the recommended limits;
validate the upper control limit and the lower control limit to create a validated upper control limit and a validated lower control limit when the upper control limit and the lower control limit are within the recommended limits;
store, in a memory, the validated upper control limit and the validated lower control limit associated with the monitored customer device;
receive, from the monitored customer device, an indication of an out-of-bounds event, wherein the out-of-bounds event includes a device identifier for the monitored customer device, an event identifier, and a detection method for at least one instance where the control data is outside the validated upper control limit and the validated lower control limit;
determine, based on the business rules, whether the out-of-bounds event constitutes an actionable event; and
initiate, based on the business rules, the device identifier, the event identifier, and the detection method, an action responsive to the out-of-bounds event, when the out-of-bounds event constitutes the actionable event.

13. The device of claim 12, wherein the out-of-bounds event is defined based on a set of local client rules applied by the monitored customer device.

14. The device of claim 13, wherein, when initiating the action, the processor is further configured to:
initiate notifying a warranty provider for the monitored customer device, or
initiate an automated maintenance action for the monitored customer device.

15. The device of claim 12, wherein the processor is further configured to:
update a record, in a database and associated with a customer, of the monitored customer device, based on receiving the control data associated with the monitored customer device.

16. The device of claim 15, wherein the processor is further configured to:
provide, to a user device, a report from the database showing the control data in context of the validated upper control limit or the validated lower control limit.

17. The device of claim 12, wherein the upper control limit and the lower control limit reflect installed conditions of the monitored customer device over a time period indicated in the configuration information.

18. A non-transitory computer-readable medium containing instructions executable by at least one processing unit, the computer-readable medium comprising one or more instructions for:
receiving configuration information for monitoring, via a network, control data for a monitored customer device, wherein the configuration information includes:
an upper control limit and a lower control limit of the control data for the monitored customer device, the upper control limit and lower control limit indicating customer-specific baseline control limits when the monitored customer device is installed at a customer premises, and
business rules for responding to an event where the control data is outside the customer-specific baseline control limits;
obtaining, in response to receiving the configuration information, original equipment manufacturer (OEM) or service provider recommended limits for the control data;
validating the upper control limit and the lower control limit to create a validated upper control limit and a validated lower control limit when the upper control limit and the lower control limit are within the recommended limits;
receiving, from the monitored customer device, an indication of an out-of-bounds event, wherein the out-of-bounds event includes an event identifier and a detection method for at least one instance where the control data is outside the customer-specific baseline control limits;
determining, based on the business rules, whether the out-of-bounds event constitutes an actionable event; and
initiating, based on the business rules, the event identifier, and the detection method, an action responsive to the out-of-bounds event, when the out-of-bounds event constitutes the actionable event.

19. The non-transitory computer-readable medium of claim 18, further comprising one or more instructions for:

providing, to a user device, a report showing the control data in context of the customer-specific baseline control limits.

20. The non-transitory computer-readable medium of claim 18, further comprising one or more instructions for:
providing, to a user device, a dashboard interface for presenting the control data in context of the customer-specific baseline control limits for multiple monitored customer devices.

* * * * *